(No Model.) 2 Sheets—Sheet 1.

H. EHRHARDT.
COLD SAWING APPARATUS.

No. 530,639. Patented Dec. 11, 1894.

Witnesses:

Inventor:
Heinrich Ehrhardt,
by his Attorney (No Model.) 2 Sheets—Sheet 2.

H. EHRHARDT.
COLD SAWING APPARATUS.

No. 530,639. Patented Dec. 11, 1894.

Witnesses:

Inventor:
Heinrich Ehrhardt,
by A. Faber du Faur,
his Attorney

UNITED STATES PATENT OFFICE.

HEINRICH EHRHARDT, OF DUSSELDORF, GERMANY.

COLD-SAWING APPARATUS.

SPECIFICATION forming part of Letters Patent No. 530,639, dated December 11, 1894.

Application filed May 6, 1893. Serial No. 473,252. (No model.)

*To all whom it may concern:*

Be it known that I, HEINRICH EHRHARDT, a subject of the Duke of Saxe-Coburg-Gotha, residing at Dusseldorf, in the Kingdom of Prussia, Germany, have invented new and useful Improvements in Apparatus for Increasing the Cutting Power of Cold-Saws, of which the following is a specification.

All the hitherto known constructions of circular saws for cutting metals in a cold state have the defect, that in cutting pieces of large cross-sections too large a portion of their circumference is in contact with the work,—so that too great a pressure is required for making the large number of teeth cut simultaneously into the work, and as this pressure cannot be attained in the greater part of saw constructions it results that the saw advances too little and that the work done is often unsatisfactory. To remedy this defect and to give each tooth the largest working cross-section which it is capable of overcoming, I have provided the above said saws with a device producing, when the saw blades are revolving, an oscillatory motion of the same, whereby grinding of the saws is prevented,—the saw teeth always disengage themselves from the cut and carry away a large quantity of sawdust, and consequently the work done by the saws is considerably increased.

In cutting pieces of very small cross-section the oscillatory motion of the saw blade is less useful and for this reason I have made an arrangement for quickly stopping the said motion, so that the saw works as usual.

The nature of my invention will best be understood when described in connection with the annexed drawings, in which—

Figure 1:
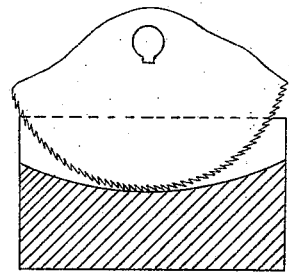
Figure 4:
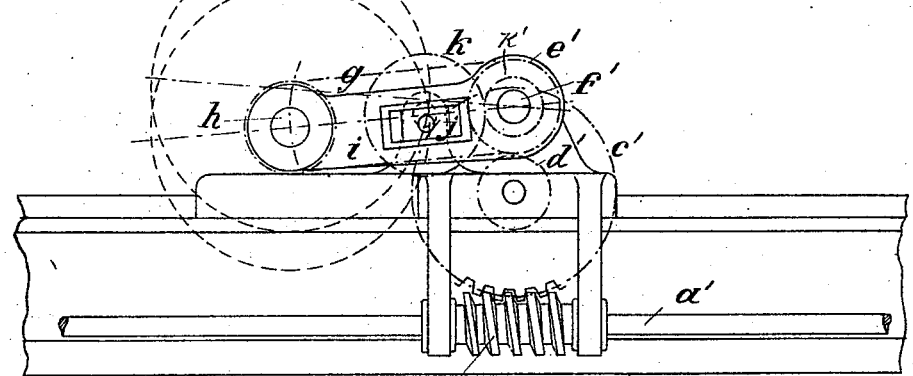
Figure 2:
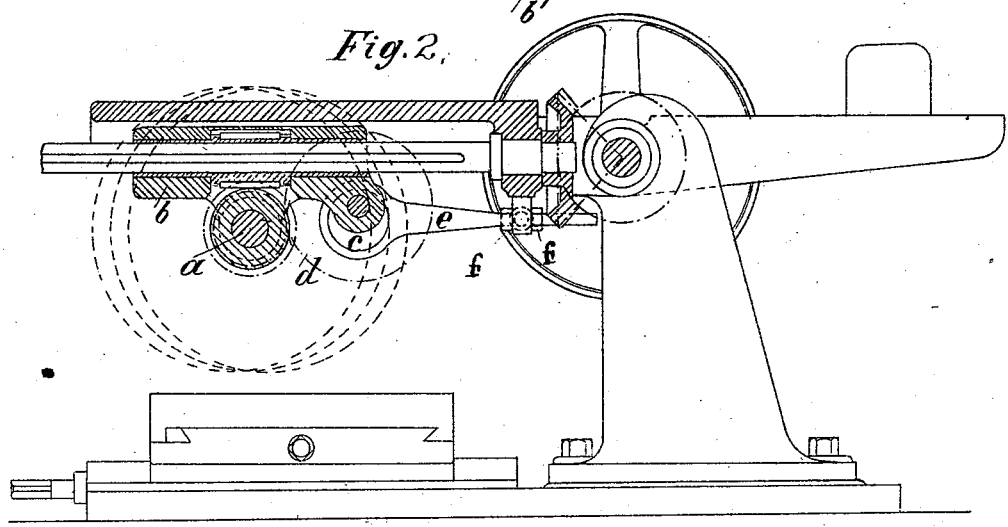
Figure 5:
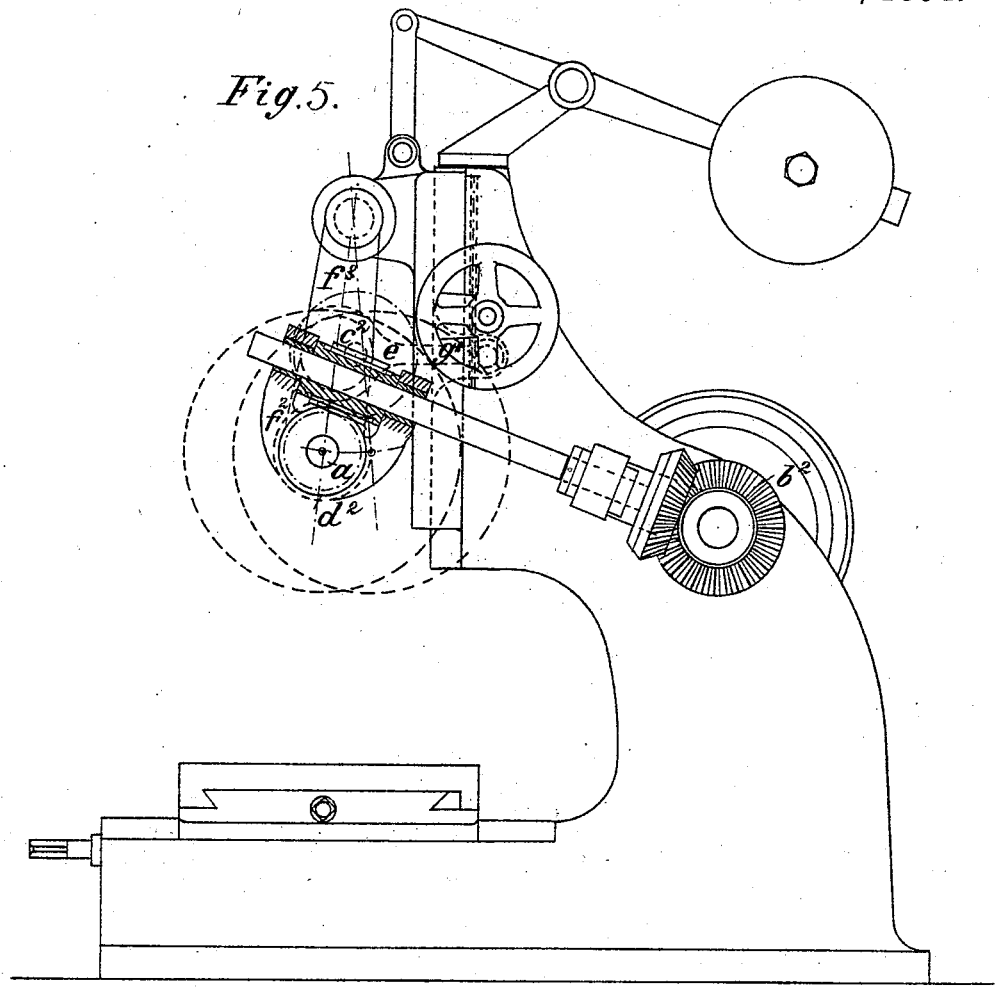
Figure 3:
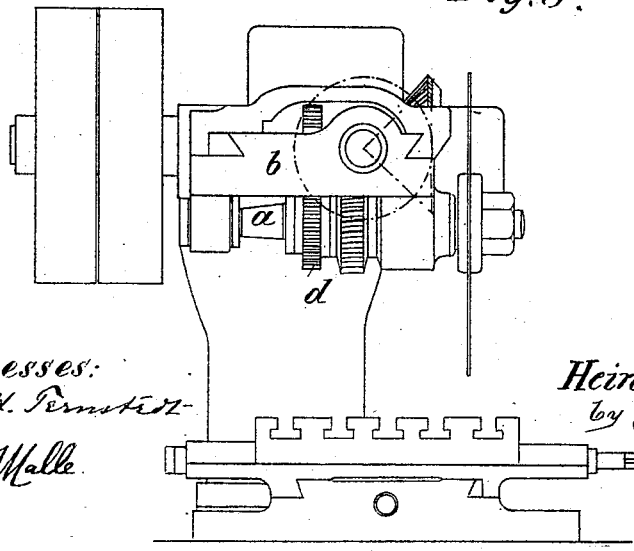

Figure 1 is a diagram illustrating the action of the saw. Fig. 2 is a sectional side elevation of a lever saw containing my improvements. Fig. 3 is an end view of the same. Fig. 4 is an elevation illustrating a modified form for the oscillating apparatus. Fig. 5 is a sectional side elevation illustrating my improvement embodied in a vertical carriage saw.

Similar letters of reference designate corresponding parts.

Referring at present to Figs. 2 and 3 of the drawings, the letter $a$ designates the saw spindle, which in the usual construction is stationary upon the lever, but in the present instance it is mounted in a carriage $b$ movably guided in suitable ways and adapted to be reciprocated by an eccentric $c$, and rod $e$. The eccentric $c$ is mounted in the carriage $b$ and is rotated by gear wheels $d\ d$ carried by the saw spindle and eccentric spindle respectively. The eccentric rod $e$ passes through a stud mounted to oscillate and its length can be adjusted by nuts $f\ f$ on opposite sides of the stud in a usual manner. It is now very evident that when the saw is revolved, the eccentric imparts an oscillatory motion thereto, causing the kerf to assume the appearance shown in Fig. 1. When for the purpose hereinbefore specified, it is desired to dispense with this oscillatory motion, the carriage $b$ is secured to the lever by the usual set screws, and the eccentric rod $e$ is permitted to reciprocate within its bearing, by setting back the nuts $f$.

The horizontal carriage cold saw shown in Fig. 4 is actuated from the worm shaft $a'$ by the worm $b'$, worm wheel $c'$, and the gear wheels $d'$ and $e'$, the latter being carried by the shaft $f'$ of the chain wheel, whence motion is imparted to the saw spindle $h$ by means of a chain $g$. The saw spindle $h$ is supported by a lever $i$ hung on the spindle $f'$, which lever is engaged and oscillated by a crank arm $j$ and a block fitted to a slotted portion of said lever. The crank arm is revolved from shaft $f'$ by gear wheels $k'\ k$ mounted respectively on said shaft and on the frame of the machine. The engagement in the longitudinal direction is effected by a spindle carried in the bed. If the lever $i$ is fixed in its position and the spur wheel $k$ disengaged from the wheel $k'$ the saw will run as usual.

Fig. 5 illustrates a modified construction of the oscillating device applied to a vertical carriage.

The saw spindle $a$ is actuated from the bevel gear $b^2$ by means of the worm $c^2$ gearing into the worm wheel $d^2$ carried by the shaft $a$. The oscillating motion is produced in this instance likewise by the eccentric $e$ actuated from the saw spindle $a$ by the spur wheel $f^2$. The eccentric rod $g'$ is hinged to the saw carriage and imparts a reciprocating motion to the saw lever carrying the eccentric. The downward adjustment takes place by the weight proper of the saw carriage. The oscillating device may in this construction also be thrown out of action by fixing the lever $f^3$ in its position and by disengaging the eccentric rod $g'$.

What I claim as new is—

1. The combination with a revolving circular saw, of means in operative connection therewith for automatically imparting thereto, while cutting, and independent of the feed motion a short oscillatory motion in its own plane and across the direction of the feed, substantially as and for the purpose specified.

2. The combination with a circular saw, of means in operative connection therewith for imparting thereto, while cutting, and independent of the feed motion a short oscillatory motion, in its own plane and across the direction of the feed and means for disconnecting the oscillatory devices, substantially as described.

3. The combination with a circular saw mounted on a carriage adapted to reciprocate across the direction of the feed, of an eccentric in operative connection with said carriage for imparting a short oscillatory motion independent of the feed motion to the same during the feed, and across the direction of the feed, substantially as described.

In testimony whereof I have signed my name to this specification in the presence of two subscribing witnesses.

HEINRICH EHRHARDT.

Witnesses:
 LOREN LISTOE,
 C. D. SCHAAFF.